(12) United States Patent
Jursich et al.

(10) Patent No.: US 9,682,339 B2
(45) Date of Patent: Jun. 20, 2017

(54) COLLAPSIBLE FILTER WITH SUPPORT STRUCTURE

(71) Applicant: RPS Products, Inc., Hampshire, IL (US)

(72) Inventors: Donald N. Jursich, Crystal Lake, IL (US); Daniel E. Schuld, Inverness, IL (US)

(73) Assignee: RPS Products, Inc., Hampshire, IL (US)

( * ) Notice: Subject to any disclaimer, the term of this patent is extended or adjusted under 35 U.S.C. 154(b) by 162 days.

(21) Appl. No.: 14/747,063

(22) Filed: Jun. 23, 2015

(65) Prior Publication Data

US 2016/0214046 A1 Jul. 28, 2016

Related U.S. Application Data

(60) Provisional application No. 62/106,786, filed on Jan. 23, 2015.

(51) Int. Cl.
| | |
|---|---|
| *B01D 46/00* | (2006.01) |
| *B01D 46/52* | (2006.01) |
| *B01D 46/42* | (2006.01) |

(52) U.S. Cl.
CPC ..... *B01D 46/0005* (2013.01); *B01D 46/0001* (2013.01); *B01D 46/4227* (2013.01); *B01D 46/521* (2013.01)

(58) Field of Classification Search
CPC ............ B01D 46/0002; B01D 46/0005; B01D 46/4227; B01D 46/521

USPC .......................................................... 55/496
See application file for complete search history.

(56) References Cited

U.S. PATENT DOCUMENTS

| | | | |
|---|---|---|---|
| 2,988,169 | A | 6/1961 | Klein |
| 3,005,516 | A | 10/1961 | Klein |
| 3,125,427 | A | 3/1964 | Smith |
| 3,675,402 | A | 7/1972 | Weed |
| 3,712,033 | A | 1/1973 | Gronholz |
| 3,778,985 | A | 12/1973 | Daigle et al. |
| 3,789,589 | A | 2/1974 | Delany |
| 4,177,050 | A | 12/1979 | Culbert |
| 4,373,635 | A | 2/1983 | Mules |
| RE32,851 | E | 1/1989 | Tarala |
| 5,013,438 | A | 5/1991 | Smith |
| 5,167,740 | A | 12/1992 | Michaelis et al. |
| 5,252,111 | A * | 10/1993 | Spencer ............. B01D 46/2455 55/489 |
| 5,312,467 | A | 5/1994 | Wolfe |
| 5,492,551 | A | 2/1996 | Wolfe |

(Continued)

*Primary Examiner* — Robert Clemente
(74) *Attorney, Agent, or Firm* — Greer, Burns & Crain, Ltd.

(57) ABSTRACT

A collapsible filter having a collapsed position and an expanded position includes a filter media, a pair of end caps that are disposed at opposite ends of the filter media, and a support structure. The support structure extends generally the height of the filter between the end caps, where the support structure includes at least one leg that has a deployed position extending generally the height of the filter between the end caps when the collapsible filter is in the expanded position. The support structure further includes an engagement structure that is located at a first end and a second end of the leg, and is configured to engage the leg with the end caps along their longitudinal length.

19 Claims, 8 Drawing Sheets

(56) References Cited

U.S. PATENT DOCUMENTS

| | | | |
|---|---|---|---|
| 5,589,067 A | 12/1996 | Rice | |
| 5,743,927 A * | 4/1998 | Osendorf | B01D 46/0005 |
| | | | 55/496 |
| 5,772,713 A | 6/1998 | Salinas | |
| 5,779,747 A | 7/1998 | Schlor et al. | |
| 5,840,094 A | 11/1998 | Osendorf | |
| 5,968,217 A | 10/1999 | Stein et al. | |
| 6,033,453 A | 3/2000 | Weddell, III | |
| 6,110,243 A | 8/2000 | Wnenchak et al. | |
| 6,126,708 A | 10/2000 | Mack et al. | |
| 6,152,980 A | 11/2000 | Culwell | |
| 6,264,713 B1 | 7/2001 | Lewis, II | |
| 6,485,538 B1 | 11/2002 | Toyoshima | |
| 6,592,643 B2 | 7/2003 | Shah | |
| 6,599,343 B2 | 7/2003 | Fredrick | |
| 6,638,333 B2 | 10/2003 | Schuld | |
| 6,652,613 B2 | 11/2003 | Shah | |
| 6,723,150 B2 | 4/2004 | Parker | |
| 6,790,261 B1 | 9/2004 | Delts | |
| 6,814,773 B2 | 11/2004 | Shah | |
| 7,037,354 B1 | 5/2006 | Dimicelli | |
| 7,077,921 B1 | 7/2006 | Dimicelli | |
| 7,452,396 B2 | 11/2008 | Terlson et al. | |
| 7,497,888 B2 | 3/2009 | Ashwood et al. | |
| 7,537,630 B2 | 5/2009 | Schuld et al. | |
| 7,727,299 B2 | 6/2010 | Knowles | |
| 8,157,881 B1 | 4/2012 | Anoszko | |
| 2003/0066274 A1 * | 4/2003 | Fredrick | B01D 46/0004 |
| | | | 55/496 |
| 2003/0066275 A1 * | 4/2003 | Schuld | B01D 46/0004 |
| | | | 55/496 |
| 2003/0066423 A1 * | 4/2003 | Shah | B01D 46/0004 |
| | | | 95/273 |
| 2003/0066424 A1 * | 4/2003 | Shah | B01D 46/0004 |
| | | | 95/273 |
| 2003/0066425 A1 * | 4/2003 | Shah | B01D 46/0004 |
| | | | 95/273 |
| 2003/0070406 A1 | 4/2003 | Duffy | |
| 2004/0182055 A1 | 9/2004 | Wynn | |
| 2006/0053759 A1 | 3/2006 | Winters et al. | |
| 2008/0034718 A1 * | 2/2008 | Schuld | B01D 46/0005 |
| | | | 55/495 |
| 2009/0077937 A1 * | 3/2009 | Privitt | B01D 46/0002 |
| | | | 55/493 |
| 2009/0145060 A1 * | 6/2009 | Kailani | B01D 46/0002 |
| | | | 52/202 |
| 2009/0151312 A1 | 6/2009 | Ashwood et al. | |
| 2013/0133301 A1 * | 5/2013 | Sproule | B01D 46/0002 |
| | | | 55/480 |
| 2015/0267927 A1 * | 9/2015 | Zhang | F24F 3/1603 |
| | | | 55/493 |

* cited by examiner

COLLAPSIBLE FILTER WITH SUPPORT STRUCTURE

PRIORITY CLAIM AND REFERENCE TO RELATED APPLICATION

This application claims the benefit of U.S. Provisional Patent Application Ser. No. 62/106,786, field Jan. 23, 2015, under 35 U.S.C. 119.

FIELD OF THE INVENTION

The present invention relates to collapsible filters, and more specifically, the present invention relates to collapsible filters with a support structure for maintaining the filter in an expanded position.

BACKGROUND OF THE INVENTION

Pleated filter media, such as collapsible pleated mechanical media (ESPM) filters, occupy substantially less space in their collapsed state, compared to equivalent cartridge configurations. Thus, they are easier to store and ship, and consequently have lower storage and shipping costs. However, collapsible filters are substantially less user-friendly than equivalent cartridge-style filters, which can be easily inserted into and removed from the filter enclosure with only minimal user interaction. In contrast, collapsible filters can require assembly by the end user before they are ready to be installed into the filter housing. Effort is made to ensure that during use, the filter is in an expanded position so that air passes through the filter and not around the filter. Thus, there exists a need for a collapsible filter that is easily expanded by the user and maintains an expanded position.

SUMMARY OF THE INVENTION

A collapsible filter having a collapsed position and an expanded position includes a filter media, a pair of end caps that are disposed at opposite ends of the filter media, and a support structure. The support structure extends generally the height of the filter between the end caps, where the support structure includes at least one leg that has a deployed position extending generally the height of the filter between the end caps when the collapsible filter is in the expanded position. The support structure further includes an engagement structure that is located at a first end and a second end of the leg, and is configured to engage the leg with the end caps along the longitudinal length of the end caps.

Another collapsible filter has a collapsed position and an expanded position and includes a filter media, a pair of end caps having a web and two flanges, where the end caps are disposed at opposite ends of the filter media, and a support structure. The support structure is configured to be attached to each of the end caps. The support structure includes at least one leg that has a stowed position that is not engaged to the end caps, and a deployed position extending between the end caps when the collapsible filter is in the expanded position. The support structure also includes an engagement structure located at a first end and a second end of the leg. The engagement structure is configured to engage the leg with the end caps along the longitudinal length of the end caps.

A further collapsible filter has a collapsed position and an expanded position and includes a filter media, a pair of end caps disposed at opposite ends of the filter media, and a support structure. The support structure is attached to each of said pair of end caps and includes at least one leg that has a stowed position, where a first portion and a second portion of the leg are generally non-linearly aligned, and a deployed position, where the first portion and the second portion of said leg are generally linearly aligned and extend between the pair of end caps when the collapsible filter is in the expanded position.

BRIEF DESCRIPTION OF THE DRAWINGS

The drawings are merely exemplary of one or more embodiments of the present invention in which.

DETAILED DESCRIPTION OF THE INVENTION

Referring to FIGS. 1-10, a filter 10 is preferably a pleated filter media such as a collapsible extended surface pleated mechanical media filter (ESPM) type such that the filter occupies substantially less space in its collapsed stated than in its expanded state. Typically, filter 10 is transported and sold in a collapsed state. At the time of installation, the filter is expanded.

The filter 10 preferably includes a filter media layer 12 (shown in FIGS. 3 and 4, and shown schematically in dashed in FIG. 1) and flexible support structure (not shown). As is well known in the art, the filter media 12 may be made of non-woven natural or synthetic fibers capable of extracting impurities from the air. However, the filter media layer 12 can be made of other known or later-developed materials.

The filter 10 preferably includes a pair of end caps 14, 16 at the top and bottom ends respectively, of the filter 10. Each end cap 14, 16 is attached to the filter media layer 12, the filter support structure, or both.

Referring now to FIGS. 1-4, the first and second embodiments of a support structure 18 include at least one and preferably four substantially rigid legs 20 that are configured to extend the height of the filter, from the top end of the filter to the bottom end of the filter, and to engage the corresponding end caps 14, 16. The legs 20 are generally elongate, having a length "L" between a first end 22 and a second end 24 that generally corresponds to the extended height "h" of the filter 10 in an expanded state. The legs 20 may be generally flat and planar, the length being substantially greater than a width between a first side 26 and a second side 28, and the width being greater than a depth between an interior side 30 and an exterior side 32. Various materials are contemplated for the legs 20, however an extruded plastic is preferred. The legs 20 may also have ribs 34 or other strength-lending structure that is preferably integrally formed with the leg.

While other configurations are contemplated, each end cap 14, 16 is preferably I-shaped or C-shaped and generally elongate, with a central web 36 and a flange 38 at each transverse side. The central web 36 is generally planar and preferably formed of cardboard, and the flanges 38 are preferably formed of plastic, such as an extruded plastic, however other materials for the web and flange are possible. Each flange 38 may be generally L-shaped, with a first portion 37 of the flange generally planar with and engaging a top surface of the web 36, and a second portion 39 generally perpendicular to the top surface of the web. There may be a third portion 41 that is generally parallel to the first portion 37 that engages a bottom surface of the web 36.

In the preferred embodiment, there are four legs 20 for each filter 10, arranged such that there are two legs that correspond to each flange 38. The first end 22 of each leg 20 engages the top end cap 14, and the second end 24 of each leg engages the bottom end cap 16. As will be discussed in more detail with respect to FIGS. 5-6 and 9-10 below, each leg 20 has an engagement structure 40, 140 at the first end 22 and the second end 24.

It is preferred that the legs 20 are spaced apart along the longitudinal length of the end caps 14, 16, such that the legs are located at or near the longitudinal ends of the end caps, however other arrangements are possible. Thus the legs 20 may be located at the sides of the filter 10 or at a distance from the sides of the filter. Further, other numbers of legs 20 are contemplated. The legs 20 are preferably disposed on the upstream and downstream sides of the filter 10.

When the filter 10 is transported and sold, the filter is in a collapsed state with the legs 20 in a stowed position unengaged with the end caps 14, 16. At the time of installation, the filter 10 is expanded by displacing the end caps 14, 16 away from each other in the height "h" direction, and the legs 20 are deployed by engaging the ends 22, 24 with the end caps to support and maintain the filter in an expanded position.

Figure 5:
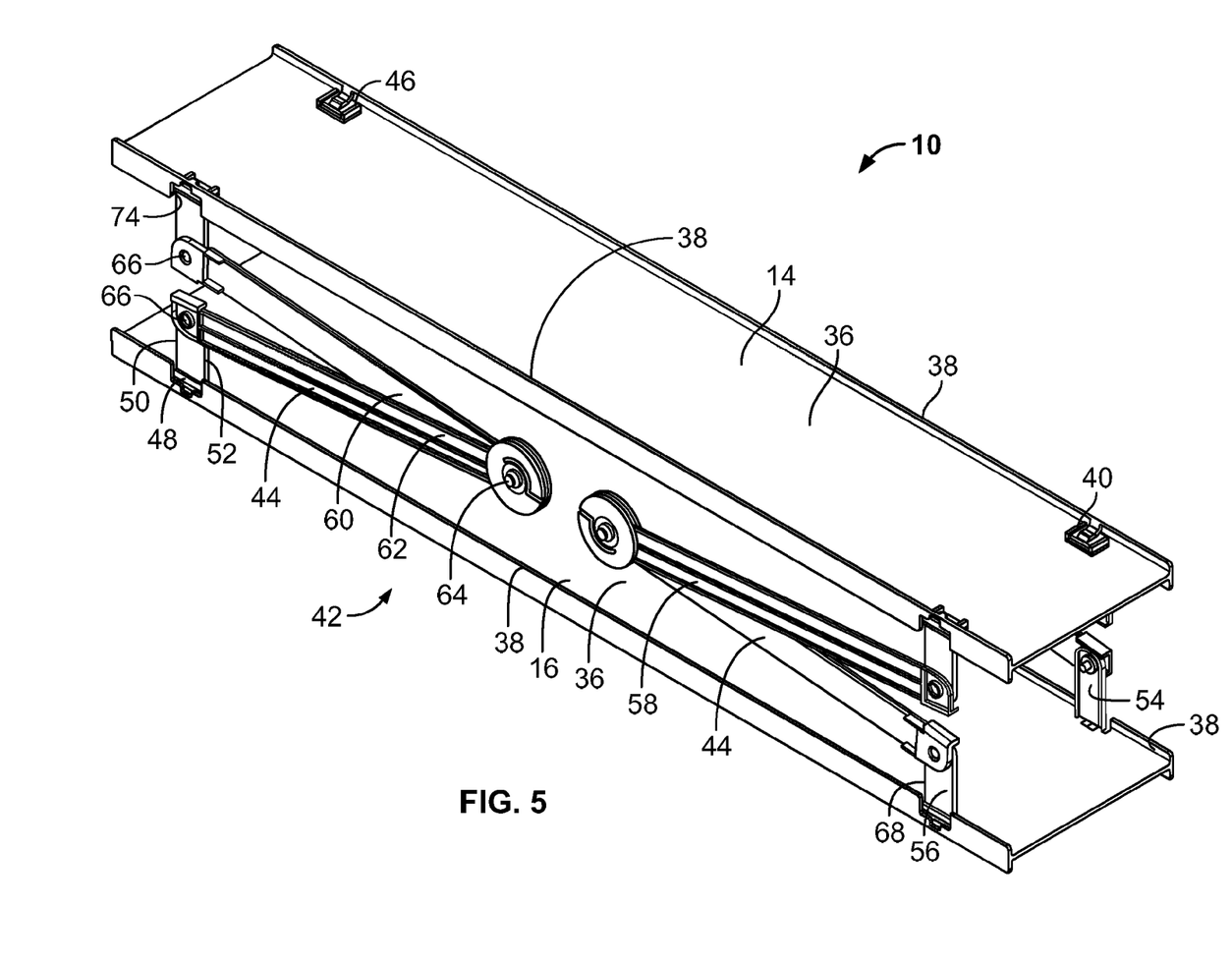
FIG. 5 is a perspective view of a collapsible filter in a collapsed position, with a third embodiment of support structure engaged to the end caps and in a stowed position.
Figure 6:
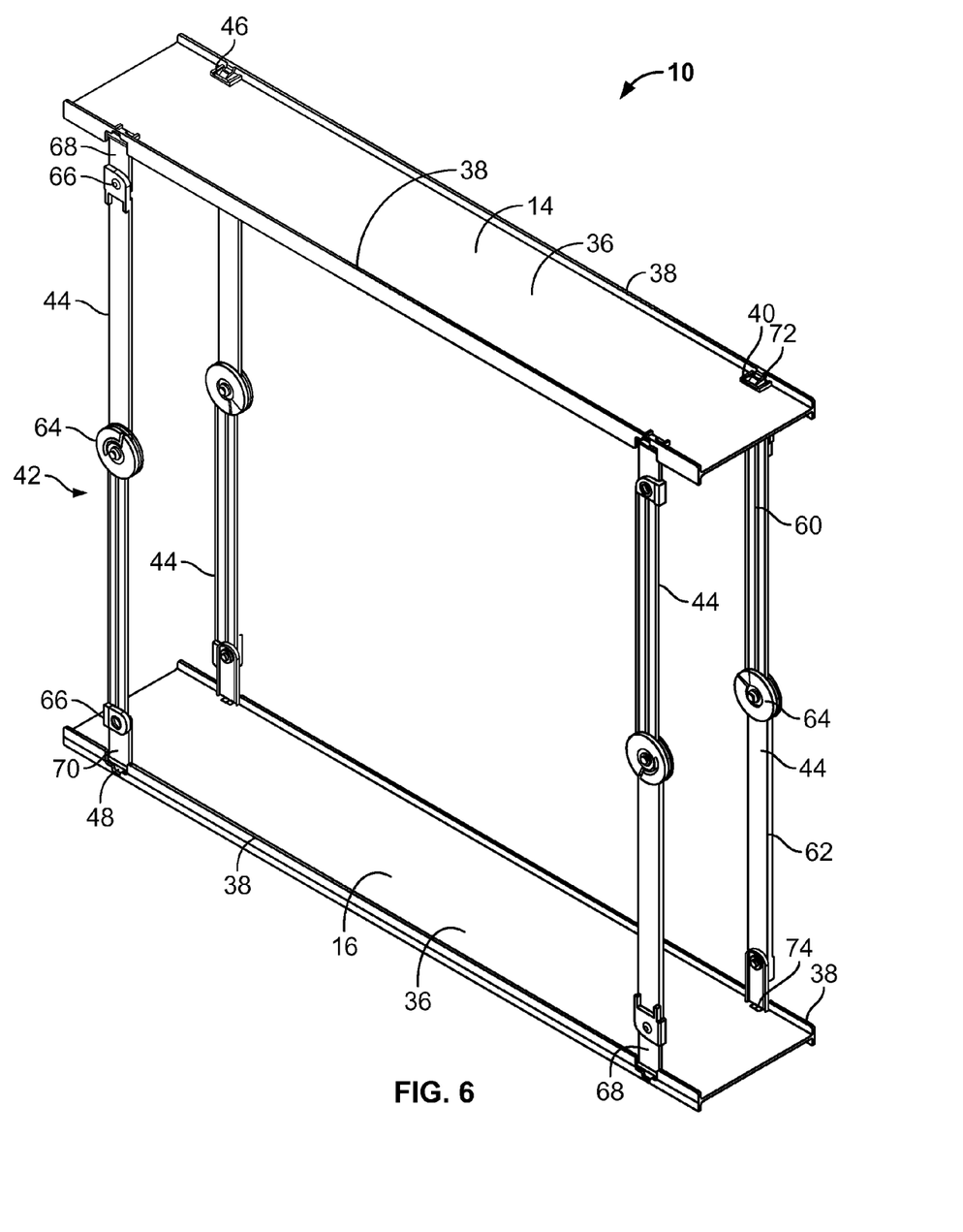
FIG. 6 is a perspective view of the collapsible filter of FIG. 3 in an expanded position, with the third embodiment of support structure engaged to the end caps and in a deployed position.

Referring now to FIGS. 5-6, the filter 10 has a third embodiment of support structure 42 that includes at least one and preferably four substantially rigid legs 44 that are configured to extend from the top end of the filter to the bottom end of the filter and to engage the corresponding end caps 14, 16. The filter media layer 12 is omitted from FIGS. 5-6 for clarity of the support structure 42. The legs 44 are generally elongate, having a length between a first end 46 and a second end 48 that generally corresponds to the extended height "h" of the filter 10 in an expanded state. The legs 44 may be generally flat and planar, the length being substantially greater than a width between a first side 50 and a second side 52, and the width being greater than a depth between an interior side 54 and an exterior side 56. Various materials are contemplated for the legs 44, however an extruded plastic is preferred. The legs 44 may also have ribs 58 or other strength-lending structure that is preferably integrally formed with the leg.

Each leg 44 preferably has a generally elongate first portion 60 and a generally elongate second portion 62 that is pivotable with respect to the first portion at a primary pin connection 64. Opposite from the primary pin connection 64, each of the first portion 60 and the second portion 62 have a secondary pin connection 66. The first portion 60 and the second portion 62 are each pivotally attached to engagement members 68 at the second pin connection 66, and each of the engagement members 68 have engagement structure 40 at the first end 46 and the second end 48 of each leg 44. In the preferred embodiment, the support structure 42 has a "scissors-type" configuration.

In the preferred embodiment, there are four legs 44 for each filter 10, arranged such that there are two legs that correspond to each flange 38. The first end 46 of each leg 44 engages the top end cap 14, and the second end 48 of each leg engages the bottom end cap 16. It is preferred that the legs 44 are spaced apart along the longitudinal length of the end caps 14, 16, such that the legs are located generally adjacent to, but not at, the longitudinal ends of the end caps, however other arrangements are possible. Thus the legs 20 may be located a distance from the sides of the filter 10. The legs 44 are preferably disposed on the upstream and downstream sides of the filter 10. Further, other numbers of legs 44 are contemplated.

When the filter 10 is transported and sold, the filter is in a collapsed state with the legs 44 in the stowed, collapsed position shown in FIG. 5. The first portion 60 and the second portion 62 are non-linearly aligned in the stowed position. In the preferred embodiment, the legs 44 are attached to the end caps 14, 16 in the stowed position. At the time of installation, the filter 10 is expanded by displacing the end caps 14, 16 away from each other, and the legs 44 are deployed by the pivoting of the first portion 60 relative to the second portion 62 at the primary pin connection 66, and by the pivoting of the first portion 60 and the second portion 62 relative to their corresponding engagement members 68. When the first portion 60 and the second portion 62 are generally vertically or generally linearly aligned, the legs 44 are locked in place in the deployed, expanded position shown in FIG. 6. It is contemplated that the primary pin connection 66 has a locking feature.

Figure 7:
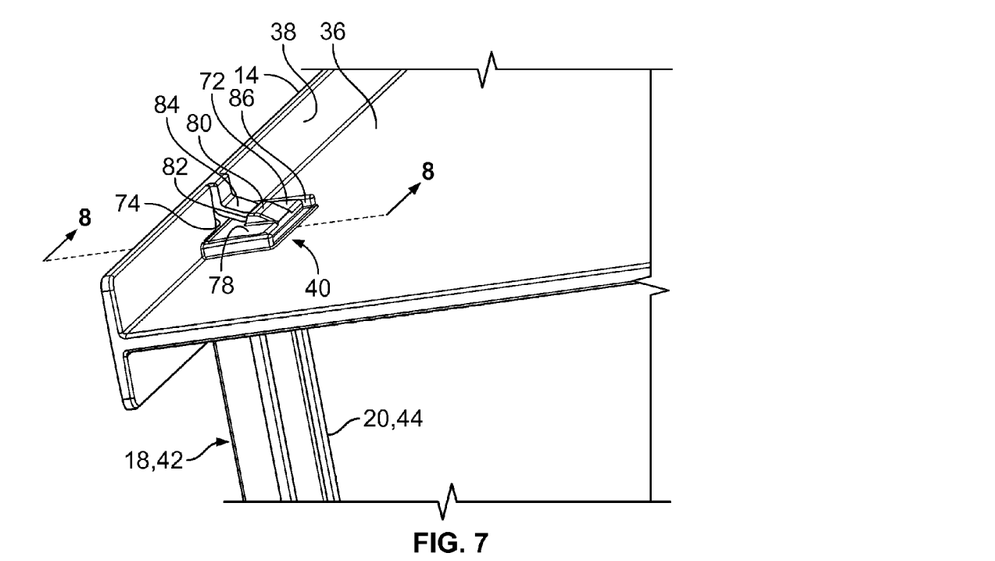
FIG. 7 is a detail view of an engagement structure of FIGS. 1-2 and 5-6 that is engaged to the end caps.
Figure 8:
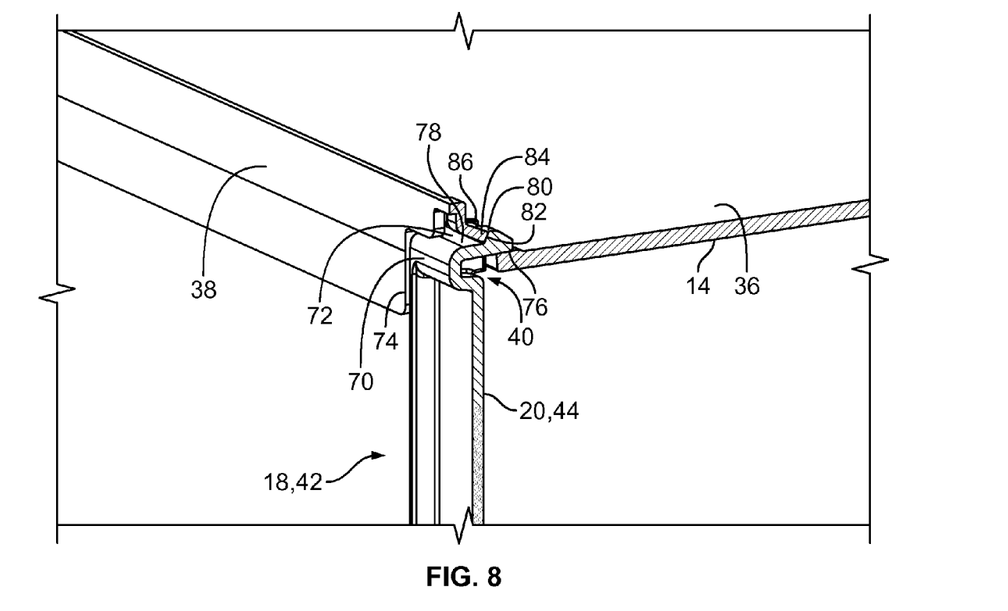
FIG. 8 is a sectional view along line 8-8 in FIG. 7.

Referring now to FIGS. 7-8, the engagement structure 40 of the first and third embodiments of support structure 18, 42 is shown engaged to the end cap 14, 16. In the support structure 18 of FIGS. 1-2, the engagement structure 40 is preferably integrally formed at the first end 22 and the second end 24. In the support structure 42 of FIGS. 2-4, the engagement structure 40 is preferably disposed on the engagement member 68 located at the first end 46 and the second end 48.

The engagement structure 40 engages with the end caps 14, 16 and includes a first portion 70 that is generally coextensive with the leg 20, 44, and a second portion 72 that is generally perpendicular to the first portion. The engagement structure 40 is introduced through a slot 74 formed in the end cap 14, 16, preferably at the location of the junction of the web 36 and the flange 38 such that an interior surface 76 of the second portion 72 contacts the top surface of the web. An exterior surface 78 of the second portion 72 may include a ramp 80 with a stop 82. When the engagement structure 40 is introduced into the slot 74, a tab 84 of the flange 38 deforms as it traverses the ramp 80 and becomes seated at the stop 74. A mating receiving structure 86, such as a recess or walls, may be formed in the web 36 to seat the second portion 72 of the engagement structure when the first portion 70 is generally flush with the exterior surface of the flange 38.

Figure 1:
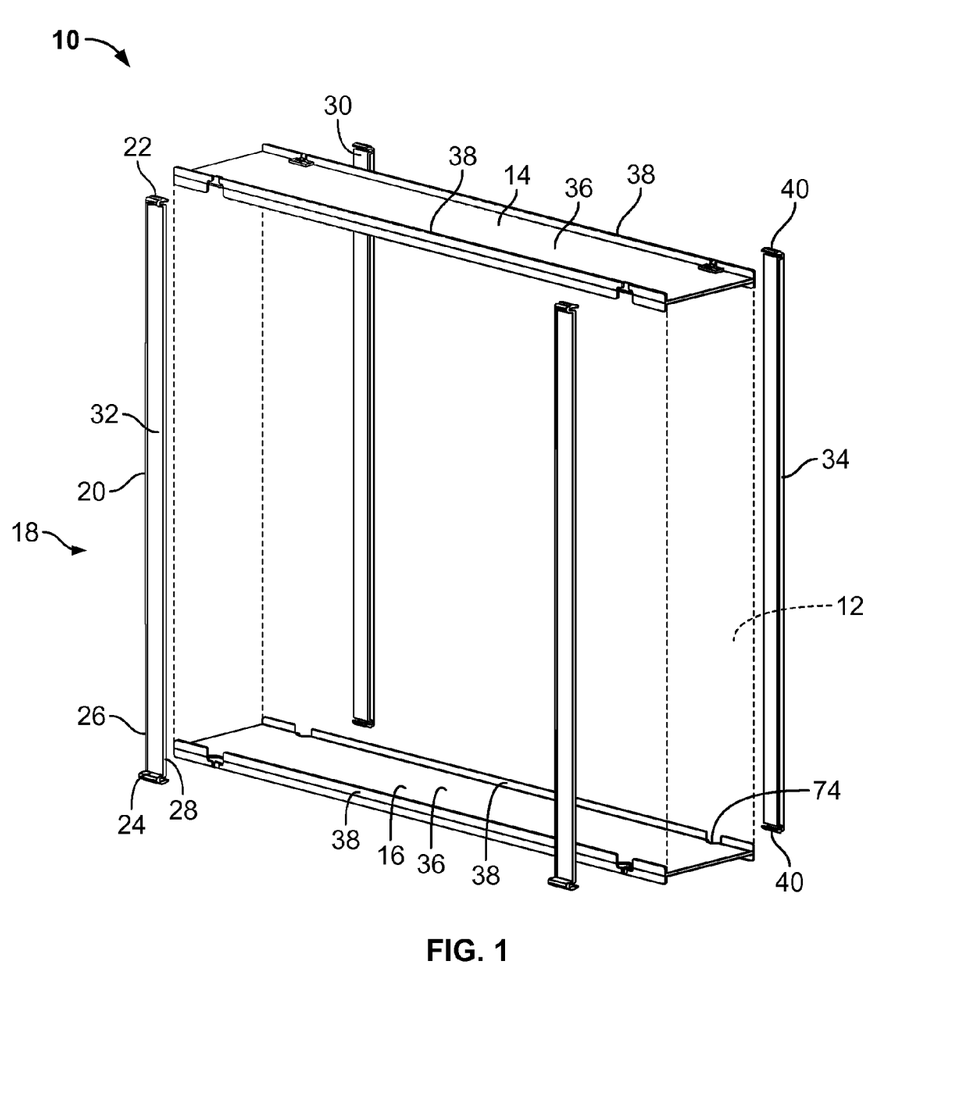
FIG. 1 is a perspective view of a collapsible filter in an expanded position, the filter having a support structure shown prior to a deployed engagement with the end caps of the filter.
Figure 2:
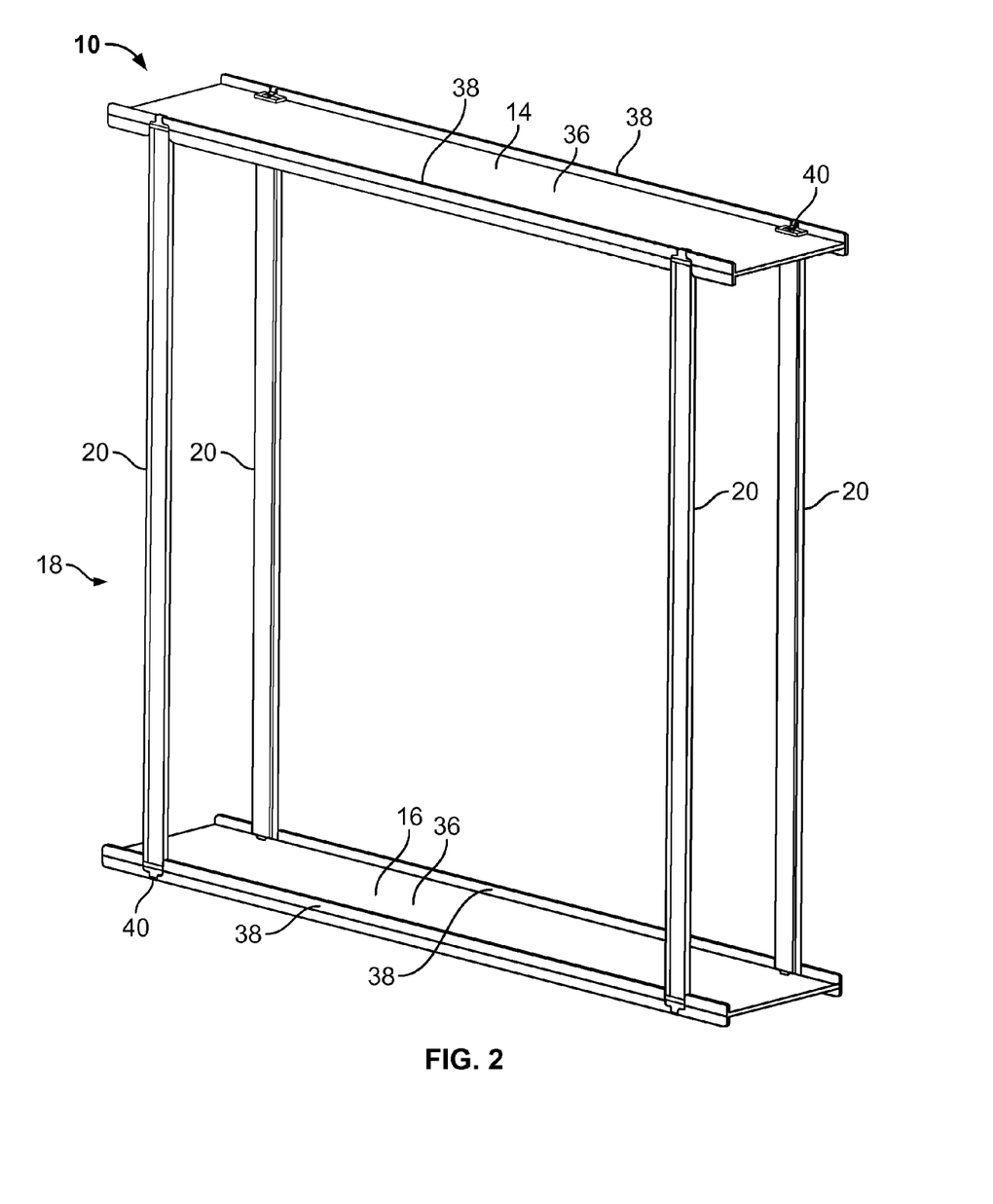
FIG. 2 is a perspective view of the collapsible filter of FIG. 1 in an expanded position, with the support structure engaged to the end caps in a deployed position.
Figure 3:
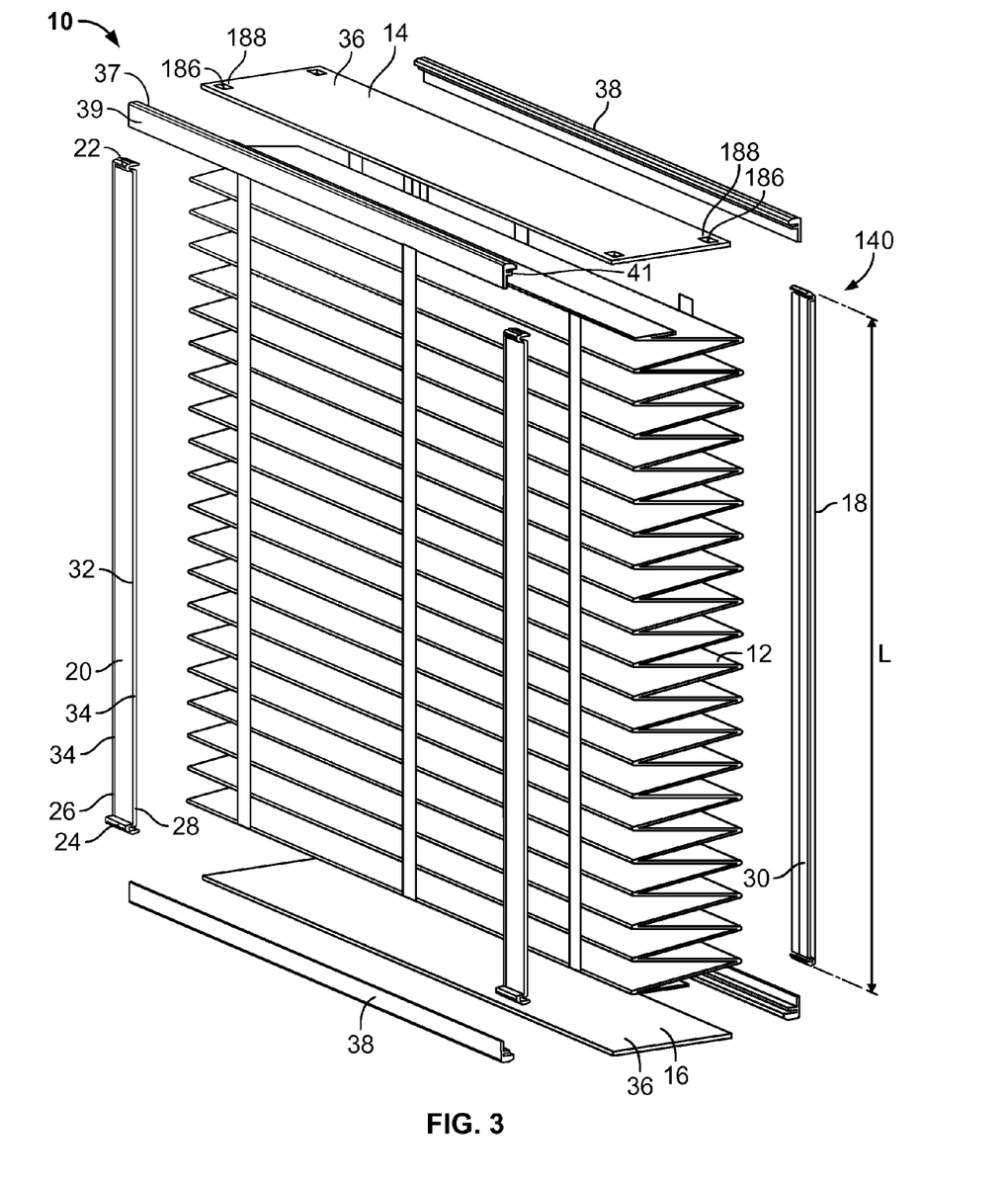
FIG. 3 is an exploded perspective view of a collapsible filter in an expanded position, the filter having a second embodiment of support structure.
Figure 4:
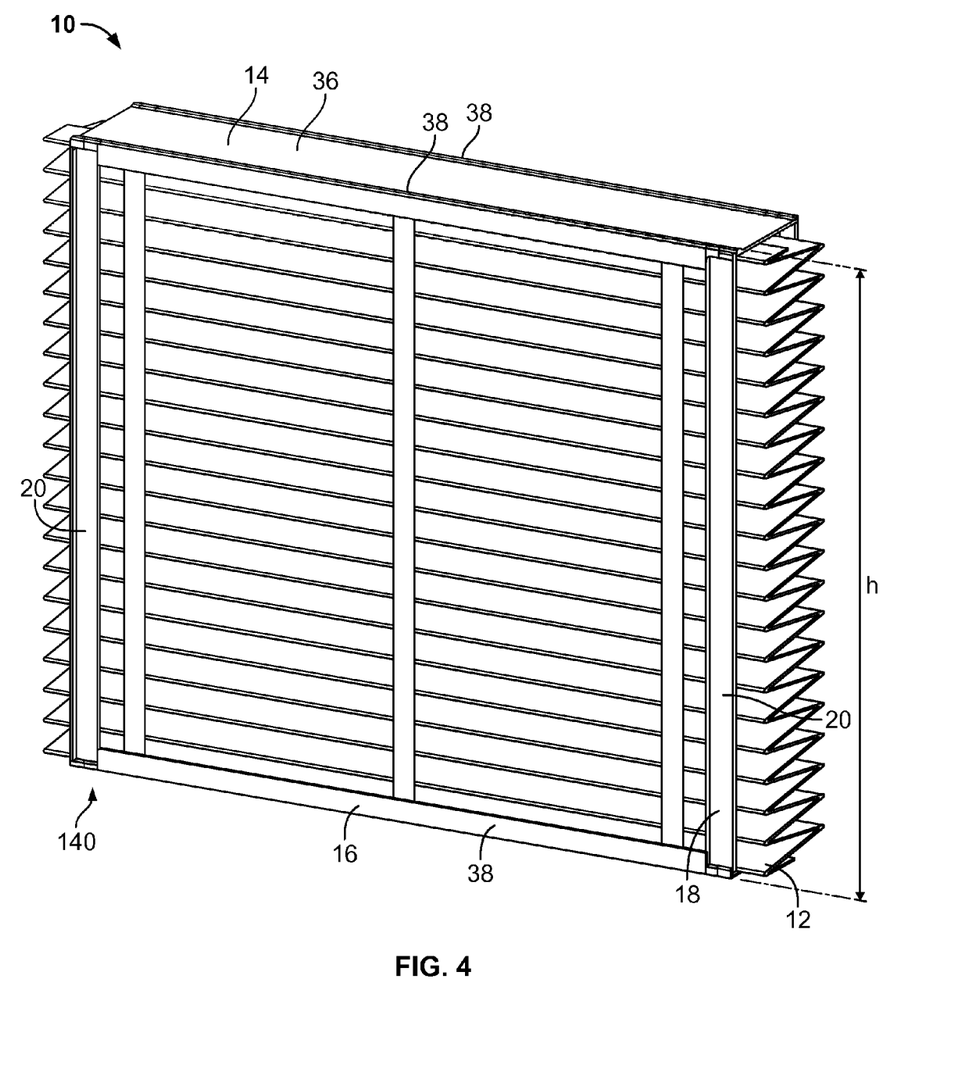
FIG. 4 is an assembled perspective view of the collapsible filter in an expanded position, with the second embodiment of support structure engaged to the end caps in a deployed position.

Referring now to FIGS. 3, 4, 9 and 10, the second embodiment of engagement structure 140 corresponding to the filter of FIGS. 3-4 is shown. While the engagement structure 140 is shown on legs 20, it should be appreciated that the engagement structure 140 can also be used with the scissor-type legs 44.

Figure 10:
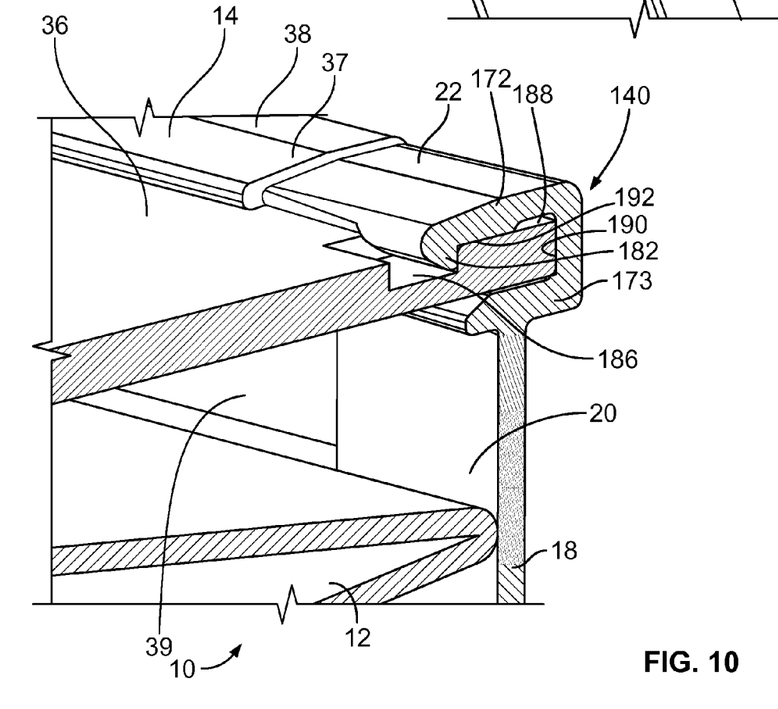
FIG. 10 is a detailed section view showing the engagement structure of FIG. 9 engaged to the end cap of FIGS. 3-4.

As seen in FIG. 10, the flanges 38 on the end caps 14, 16 are generally L-shaped and do not extend the full longitudinal length of the web 36, leaving a leg-receiving structure 188. The leg-receiving structure 188 may be defined by the top surface of the web 36 along the edge of the web, where the web is exposed due to an absence of the flange 38, however other leg-receiving structures are contemplated. The leg-receiving structure 188 receives the leg 20, 44. An end-cap slot 190 is formed in the leg 20, 44 between the second portion 172 and a first portion 173 of the engagement structure 140, which are generally parallel to each other, and which are both generally perpendicular to the length "l" of the leg. The end-cap slot 190 is introduced and engaged onto the leg-receiving structure 188 of the end caps 14, 16. The leg-receiving structure 188 includes a mating receiving structure 186, for example a recess on the top surface of the web 36.

Figure 9:
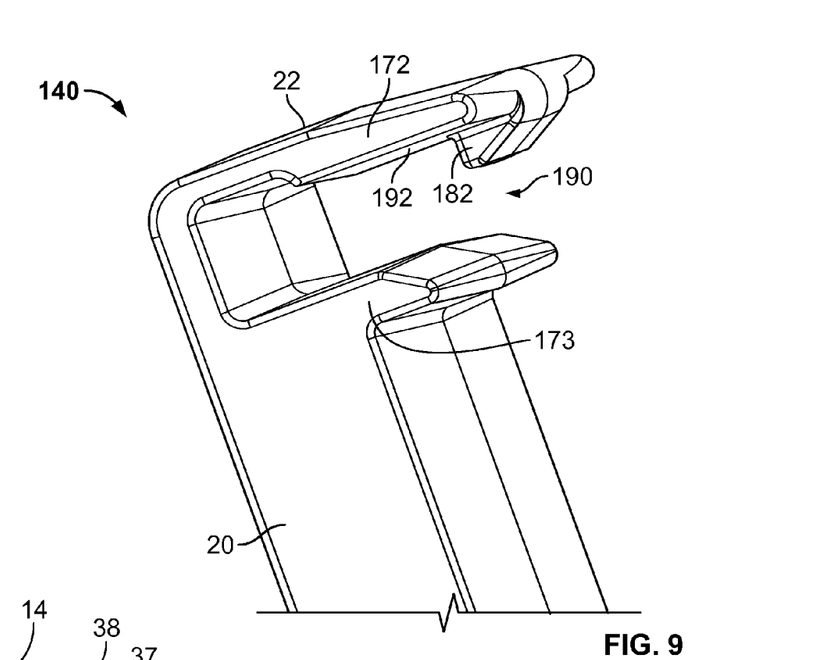
FIG. 9 is a detail view of an engagement structure of the support structure of FIGS. 3-4.

At an interior surface 192 of the second portion 172, the engagement structure 140 includes a stop 182. The stop 182 protrudes from the interior surface 192 in a direction generally parallel to the length of the leg 20, 44, and is configured to mechanically engage the mating receiving structure 186, however other stops are contemplated. In the preferred embodiment, when the engagement structure 140 is introduced onto the web 36, the protruding stop 182 becomes seated in the recessed mating receiving structure 186 to lock the leg 20, 44 to the end caps 14, 16. When seated, the leg 20, 44 has a positive attachment to the end caps 14, 16 to maintain the leg to the end cap and to maintain the filter 10 in a deployed, expanded position. To collapse the filter 10, the legs 20, 44 can be removed by unseating the stop 182 from the mating receiving structure 186.

While particular embodiments of the collapsible filter 10 with support structure 18, 42 have been shown and described, it will be appreciated by those skilled in the art that changes and modifications may be made thereto without departing from the invention in its broader aspects and as set forth in the following claims.

What is claimed is:

1. A collapsible filter having a collapsed position and an expanded position, comprising:
   a filter media having an upstream side and a downstream side opposite from said upstream side, and two side surfaces that are generally perpendicular to said upstream side and said downstream side;
   a pair of end caps disposed at opposite ends of said filter media; and
   a support structure that extends generally the height of the filter between each of said pair of end caps;
      wherein said support structure includes at least one leg that has a deployed position extending generally the height of the filter between said pair of end caps when the collapsible filter is in the expanded position, wherein said at least one leg extends between said end caps at at least one of said upstream side and said downstream side of said filter media, and said at least one leg not extending between said end caps at either of said two side surfaces of said filter media;
   wherein said support structure further includes an engagement structure located at a first end of said leg and located at a second end of said leg, said engagement structure is configured to engage said at least one leg with said pair of end caps along the longitudinal length of said pair of end caps.

2. The collapsible filter of claim 1, wherein said pair of end caps are formed of a web and L-shaped flanges.

3. The collapsible filter of claim 2 wherein said web is formed of cardboard and said flanges are formed of plastic.

4. The collapsible filter of claim 1 wherein said at least one leg is formed of plastic.

5. The collapsible filter of claim 1 wherein said pair of end caps further comprises a leg-receiving structure for receiving said engagement structure of said at least one leg.

6. The collapsible filter of claim 5 wherein said engagement structure further comprises an end-cap slot that is introduced and engaged onto the leg-receiving structure of said at least one said end cap.

7. The collapsible filter of claim 5 wherein said leg-receiving structure further comprises a mating receiving structure.

8. The collapsible filter of claim 7 wherein said engagement structure further comprises a stop that is configured to be seated in said mating receiving structure.

9. The collapsible filter of claim 8 wherein said stop is disposed on an interior surface of a second portion of said engagement structure, wherein said second portion is generally perpendicular to the length of said at least one leg.

10. A collapsible filter having a collapsed position and an expanded position, comprising:
    a filter media having an upstream side and a downstream side opposite from said upstream side, and two side surfaces that are generally perpendicular to said upstream side and said downstream side;
    a pair of end caps formed of cardboard are disposed at opposite ends of said filter media; and
    a support structure that is configured to be attached to each of said pair of end caps;
    wherein said support structure includes at least one leg that has a stowed position that is not engaged to said pair of end caps, and a deployed position extending between said pair of end caps when the collapsible filter is in the expanded position, wherein said at least one leg extends between said end caps at at least one of said upstream side and said downstream side of said filter media, and said at least one leg not extending between said end caps at either of said two side surfaces of said filter media;
    wherein said support structure further includes an engagement structure located at a first end of said leg and located at a second end of said leg that is configured to engage said leg with said pair of end caps along the longitudinal length of said pair of end caps.

11. The collapsible filter of claim 10 wherein said engagement structure further comprises an end-cap slot that is introduced onto said at least one said end cap.

12. The collapsible filter of claim 10 wherein said end-cap slot is defined between a first portion and a second portion of said engagement structure that are generally parallel to each other, wherein said first portion and said second portion are both generally perpendicular to the length of said at least one leg.

13. The collapsible filter of claim 10 wherein said pair of end caps further comprises a leg-receiving structure for receiving said engagement structure of said at least one leg.

14. The collapsible filter of claim 13 wherein said leg-receiving structure further comprises a mating receiving structure.

15. The collapsible filter of claim 14 wherein said engagement structure further comprises a stop that is configured to be seated in said mating receiving structure.

16. The collapsible filter of claim 10 wherein said leg is generally elongate and formed of plastic.

17. A collapsible filter having a collapsed position and an expanded position, comprising:
- a filter media having an upstream side and a downstream side opposite from said upstream side, and two side surfaces that are generally perpendicular to said upstream side and said downstream side;
- a pair of end caps disposed at opposite ends of said filter media; and
- a support structure that is attached to each of said pair of end caps;

wherein said support structure includes at least one leg that has a stowed position where a first portion and a second portion of said leg are generally non-linearly aligned, and a deployed position wherein said first portion and said second portion of said leg are generally linearly aligned and extend between said pair of end caps when the collapsible filter is in the expanded position, wherein said at least one leg extends between said end caps at at least one of said upstream side and said downstream side of said filter media, and said at least one leg not extending between said end caps at either of said two side surfaces of said filter media.

18. The collapsible filter of claim 17 wherein said leg is generally elongate and formed of plastic.

19. The collapsible filter of claim 17 wherein said pair of end caps are formed of cardboard.

* * * * *